US012802903B2

(12) United States Patent
Hung et al.

(10) Patent No.: US 12,802,903 B2
(45) Date of Patent: Nov. 17, 2026

(54) SWITCH MECHANISM AND RELATED ELECTRONIC DEVICE

(71) Applicant: Wistron Corporation, New Taipei City (TW)

(72) Inventors: Chi-Yu Hung, New Taipei City (TW); Chia-Lin Kao, New Taipei City (TW); Hsin-Yu Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 297 days.

(21) Appl. No.: 18/624,148

(22) Filed: Apr. 2, 2024

(65) Prior Publication Data

US 2025/0308811 A1 Oct. 2, 2025

(30) Foreign Application Priority Data

Jan. 16, 2024 (TW) ................................ 113101678

(51) Int. Cl.
*H01H 13/02* (2006.01)
*F21V 7/00* (2006.01)
*H01H 13/32* (2006.01)

(52) U.S. Cl.
CPC ......... *H01H 13/023* (2013.01); *F21V 7/0033* (2013.01); *F21V 7/0091* (2013.01); *H01H 13/32* (2013.01)

(58) Field of Classification Search
CPC ...... H01H 13/023; H01H 13/83; H01H 13/14; H01H 13/32; H01H 2219/06; F21V 7/0091; F21V 7/0033; G02B 5/00; G02B 5/02; G02B 5/0284; G02B 5/08; G02B 5/0816; G02B 5/12; G02B 5/26; G02B 6/3564; G02B 15/00; G02B 17/00; G02B 17/002; G02B 17/004; G02B 17/06; G02B 26/00; G02B 26/001; G02B 26/007; G02B 30/00; G02B 30/34; G02B 30/40; G02B 30/50; G02B 30/54; G02B 30/56; G02B 30/60; G02B 5/3016; G02B 5/3083; G02B 27/0172; G02B 2027/0185; G02F 2203/62; G02F 2203/00; G02F 2203/02; G02F 2203/023; G02F 2203/026; G02F 1/00; G02F 1/01; G02F 1/133; G02F 1/1336; G02F 1/133627; G02F 1/133602; G02F 1/133605; G02F 1/133533; G02F 1/133636; G02F 1/133638; G02F 1/133749;

(Continued)

(56) References Cited

U.S. PATENT DOCUMENTS 7,525,056 B2 * 4/2009 Chiba .................... H01H 13/83
200/314
2023/0400931 A1 * 12/2023 Yao ..................... H01H 13/704

* cited by examiner

*Primary Examiner* — Anthony R Jimenez
(74) *Attorney, Agent, or Firm* — Winston Hsu

(57) ABSTRACT

A switch mechanism of providing dynamic pattern effect is applied to an electronic device and includes a case, a total reflection component, a semi-reflection component, an actuation module and an operation component. The total reflection component is movably disposed inside the case. The semi-reflection component is disposed inside the case and relative to the total reflection component. The actuation module is connected to the total reflection component. The operation component is disposed on a surface of the semi-reflection component opposite to the total reflection component. The actuation module is selectively driven by the operation component so that the total reflection component can be moved relatively to the semi-reflection component selectively.

20 Claims, 10 Drawing Sheets

(58) Field of Classification Search
CPC ............. G02F 1/0311; G02F 1/133631; G02F 1/134363; G02F 1/133531; G02F 1/29; G02F 1/291; G02F 1/294
USPC .......................................................... 200/341
See application file for complete search history.

SWITCH MECHANISM AND RELATED ELECTRONIC DEVICE

BACKGROUND OF THE INVENTION

1. Field of the Invention

The present invention relates to a switch mechanism and an electronic device, and more particularly, to a switch mechanism of providing dynamic pattern effects and a related electronic device.

2. Description of the Prior Art

With the advanced technology, the computer apparatus can design the customized illumination effect on the casing for preferred artistic appearance. The conventional illumination effect on the casing utilizes the light bar to decorate the casing, or installs the lighting switch on the casing. The conventional lighting switch has an outer cover of the electronic switch made by light-transmitting material, or installs the light source around the electronic switch made by opaque material. An illuminate beam emitted by the light source passes through the outer cover of the electronic switch to provide the illumination switch. However, the static lighting effect of the conventional illumination switch is monotonous, and design of an illumination switch with dynamic pattern effects is an important issue in the related computer apparatus industry.

SUMMARY OF THE INVENTION

The present invention provides a switch mechanism of providing dynamic pattern effects and a related electronic device for solving above drawbacks.

According to the claimed invention, a switch mechanism includes a case, a total reflection component, a semi-reflection component, an actuation module and an operation component. The total reflection component is movably disposed inside the case. The semi-reflection component is disposed inside the case and relative to the total reflection component. The actuation module is connected to the total reflection component. The operation component is disposed on a surface of the semi-reflection component opposite to the total reflection component. The actuation module is selectively driven by the operation component so that the total reflection component is moved relatively to the semi-reflection component.

According to the claimed invention, the total reflection component includes a total reflective mirror and a lighting element, the lighting element is disposed on a surface of the total reflective mirror away from the semi-reflection component.

According to the claimed invention, the total reflection component includes a total reflective mirror and a lighting element, the lighting element is disposed on a lateral side of the total reflective mirror.

According to the claimed invention, the total reflective mirror includes a groove, illumination light of the lighting element passes through the groove to form a pattern, the groove is formed on a surface of the total reflective mirror facing the semi-reflection component, or formed on a surface of the total reflective mirror away from the semi-reflection component, or formed inside the total reflective mirror.

According to the claimed invention, the actuation module includes a bridging component and a driving component, the driving component is connected to the total reflection component, the bridging component is movably disposed on a lateral surface of the case. The driving component is moved selectively by the operation component through the bridging component, and the total reflection component is selectively driven by the driving component.

According to the claimed invention, the bridging component is spaced from the operation component, or is integrated with the operation component monolithically.

According to the claimed invention, the bridging component includes a rack structure, the driving component includes a gear, a cam and a connection shaft, the gear and the cam are respectively disposed on two opposite ends of the connection shaft, the cam abuts against the total reflection component, and the gear is engaged with the rack structure.

According to the claimed invention, the driving component further includes a torsion spring disposed on the connection shaft, and the cam is driven by the motion of the total reflection component via a resilient recovering force of the torsion spring.

According to the claimed invention, the bridging component is a plate body, the driving component is a compression spring disposed on a surface of the total reflection component away from the semi-reflection component, and the compression spring is pushed by the plate body selectively via the total reflection component to store a resilient recovering force.

According to the claimed invention, the switch mechanism further includes a resilient component disposed between the operation component and the case.

According to the claimed invention, an electronic device includes a housing and a switch mechanism. The mechanism is disposed inside the housing. The switch mechanism includes a case, a total reflection component, a semi-reflection component, an actuation module and an operation component. The total reflection component is movably disposed inside the case. The semi-reflection component is disposed inside the case and relative to the total reflection component. The actuation module is connected to the total reflection component. The operation component is disposed on a surface of the semi-reflection component opposite to the total reflection component. The actuation module is selectively driven by the operation component so that the total reflection component is moved relatively to the semi-reflection component.

According to the claimed invention, the case has an electronic switch, and the bridging component is driven by the operation component to actuate the electronic switch, so that a lighting element of the total reflection component emits illumination light accordingly.

The switch mechanism and the electronic device of the present application can use the actuation module to set connection between the operation component and the total reflection component. When the operation component of the switch mechanism is pressed, the electronic switch can be actuated, and the bridging component of the actuation module can move the total reflection component relative to the semi-reflection component, and the driving component of the actuation module can further change a movement of the total reflection component relative to the semi-reflection component into the reciprocation motion, so that the switch mechanism can provide the infinite virtual images with the sense of rhythm for preferred artistic illumination effect of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
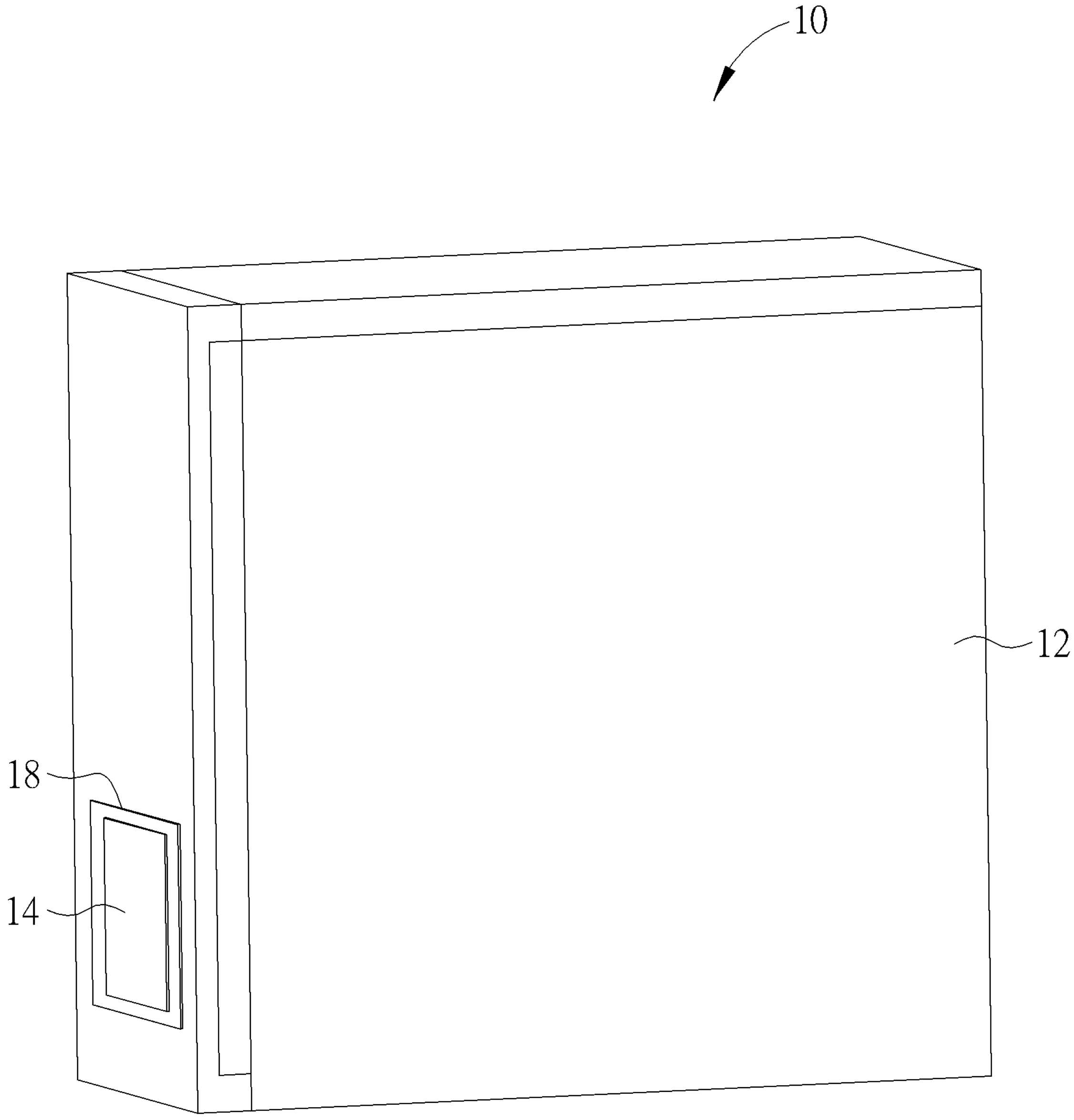
FIG. 1 is a diagram of an electronic device according to an embodiment of the present application.
Figure 2:
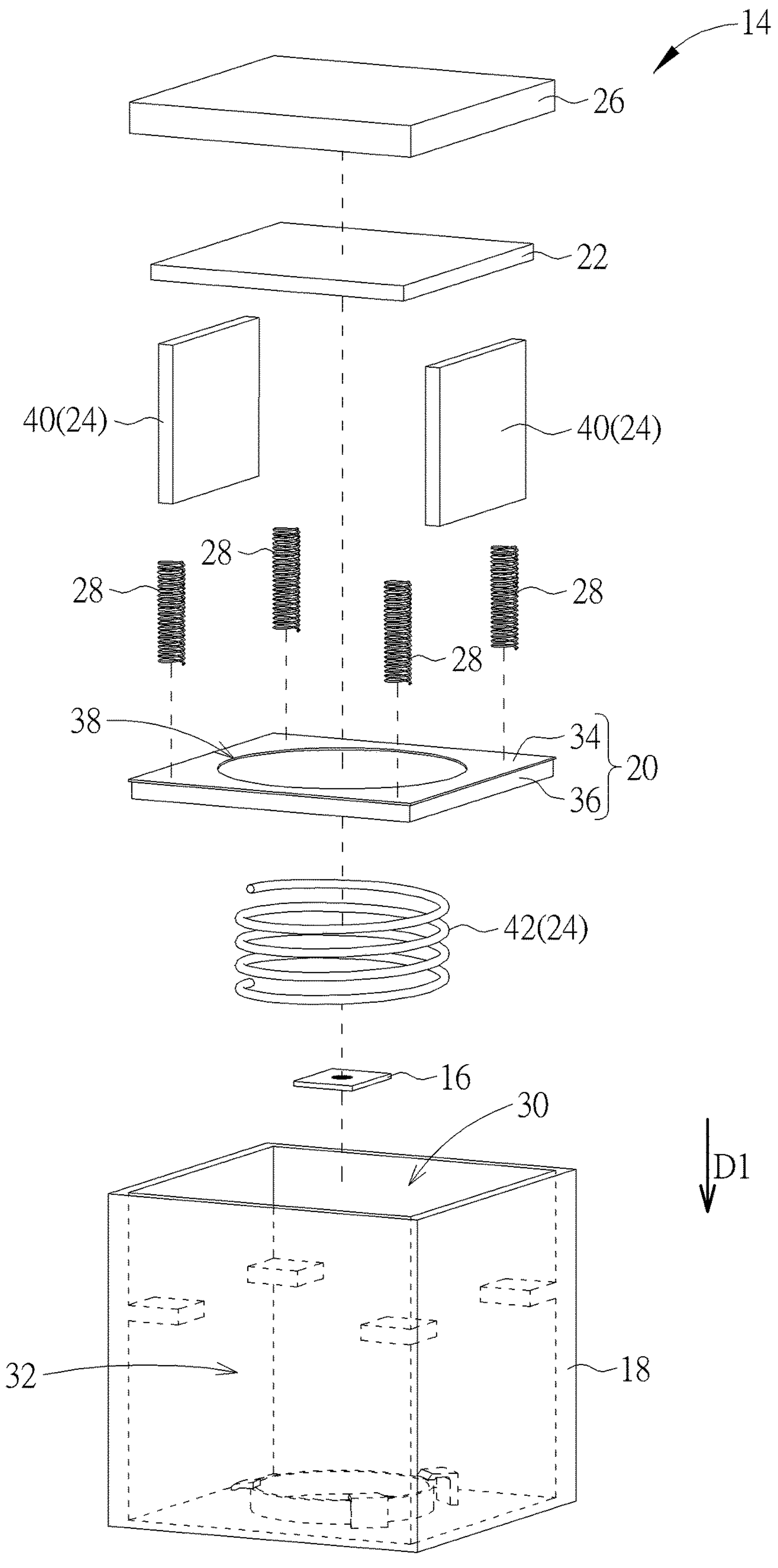
FIG. 2 is an exploded diagram of a switch mechanism according to the embodiment of the present application.

Please refer to FIG. 1 and FIG. 2. FIG. 1 is a diagram of an electronic device 10 according to an embodiment of the present application. FIG. 2 is an exploded diagram of a switch mechanism 14 according to the embodiment of the present application. The electronic device 10 can be various types of computer apparatus, and can include a housing 12 and a switch mechanism 14. The housing 12 can accommodate several electronic components, such as an electronic switch 16; other electronic components, such as a circuit board, a hard drive, a memory and a cooling fan, are not drawn in the figures. The switch mechanism 14 can be disposed in the housing 12 and used to actuate the electronic switch 16. The switch mechanism 14 of the present application can provide specific illumination effects; the switch mechanism 14 can provide a static infinite virtual image when the switch mechanism 14 is not operated, and can further provide infinite virtual images with a sense of rhythm when the switch mechanism 14 is operated.

As shown in FIG. 2, the switch mechanism 14 can include a case 18, a total reflection component 20, a semi-reflection component 22, an actuation module 24, an operation component 26 and a resilient component 28. The case 18 can be engaged with an assembly hole of the housing 12. The case 18 can have an accommodating portion 32 surrounded by several lateral surfaces and a bottom surface (which are not marked in the figures), and further have an opening portion 30 surrounded by edges of the foresaid lateral surfaces. The opening portion 30 can be communicated with the accommodating portion 32. The electronic switch 16 can be disposed inside the case 18. The total reflection component 20 can be movably disposed inside the accommodating portion 32. The semi-reflection component 22 can be disposed inside the accommodating portion 32, and can be disposed adjacent to the opening portion 30 than the total reflection component 20; which means the total reflection component 20 is close to the bottom of the case 18 than the semi-reflection component 22.

The actuation module 24 can be connected to the total reflection component 20. Variation of the actuation module 24 can be illustrated in the following description. The operation component 26 can be movably disposed adjacent to the opening portion 30. The operation component 26 can be disposed on a side of the semi-reflection component 22 opposite to the total reflection component 20, and a part of the operation component 26 can be exposed through the assembly hole of the housing 12. The operation component 26 can be used to actuate the total reflection component 20 to emit illumination light via the actuation module 24. The resilient component 28 can be disposed inside the accommodating portion 32 and connected to the operation component 26. It should be mentioned that the resilient component 28 may be connected to the operation component 26 in a direct manner or in an indirect manner. In some embodiments, the total reflection component 20 can emit the illumination light towards the semi-reflection component 22, so that one part of the illumination light can pass through the semi-reflection component 22 towards external space via the operation component 26, and other part of the illumination light can be reflected back and forth between the semi-reflection component 22 and the total reflection component 20.

In some embodiments, the total reflection component 20 can include a total reflective mirror 34 and a lighting element 36. The lighting element 36 can be disposed on a lateral side of the total reflective mirror 34, or a surface of the total reflective mirror 34 away from the semi-reflection component 22. The total reflective mirror 34 can include a groove 38 formed on a surface of the total reflective mirror 34 facing the semi-reflection component 22, or on a surface of the total reflective mirror 34 away from the semi-reflection component 22, or inside the total reflective mirror 34. Therefore, the illumination light emitted by the lighting element 36 can pass through the groove 38 to from a pattern in accordance with arrangement of the groove 38. Take FIG. 2 as an example, the annular groove 38 can generate the annular illumination pattern. When the illumination light emitted by the lighting element 36 passes through the groove 38 of the total reflective mirror 34 to project onto the semi-reflection component 22, the annular illumination pattern can be reflected from the semi-reflection component 22 to the total reflective mirror 34, and then the annular illumination pattern can be further reflected from the total reflective mirror 34 to the semi-reflection component 22. The illumination light can be reflected back and forth between the total reflective mirror 34 and the semi-reflection component 22 to form the annular illumination pattern in a form of multi-ring concentric circles. The annular illumination pattern in the foresaid form of multi-ring concentric circles emitted by the switch mechanism 14 can be the static infinite virtual image when the switch mechanism 14 is not operated.

In some embodiments, the semi-reflection component 22 can be disposed on a surface of the operation component 26 facing the total reflection component 20, and be spaced from the operation component 26; or, the semi-reflection component 22 can be directly attached to the operation component 26. Variation of the semi-reflection component 22 can depend on a design demand. In some embodiments, the operation component 26 can be made of transparent material or translucent material, so that the illumination light emitted by the lighting element 36 can partly pass through the operation component 26 towards the external space. The illumination light can be reflected back and forth between the total reflective mirror 34 and the semi-reflection component 22 to form the infinite virtual image, and the infinite virtual image can pass through the operation component 26 to be directly observed by a user, so that the switch mechanism 14 can provide the specific illumination effect. It should be mentioned that the semi-reflection component 22 can be an optical element with semi-transmission and semi-reflection functions. A ratio of light penetration to light reflection allowed by the semi-reflection component 22 is not limited to any specific value, and depends on the design demand.

The actuation module 24 can include a bridging component 40 and a driving component 42. In some embodiments, the bridging component 40 can be designed as a plate body disposed between the operation component 26 and the total reflection component 20, and can be movably disposed on the lateral surface of the case 18. The bridging component 40 can be spaced from the operation component 26, or can be directly connected with the operation component 26. The bridging component 40 can be driven by the operation component 26 to move the total reflection component 20. The driving component 42 can be a compression spring disposed on a bottom of the total reflection component 20. In some embodiments, the bridging component 40 can be spaced from the operation component 26; when the operation component 26 is pressed, the operation component 26 can be moved a certain distance in a first direction D1 to contact against the bridging component 40. The certain distance can be an interval between the bridging component 40 and the operation component 26. When the bridging component 40 is pushed by the operation component 26, the bridging component 40 can push the total reflection component 20 in the first direction D1, and the driving component 42 (such as the compression spring) can be resiliently deformed. When an external force applied to the operation component 26 is removed, a resilient recovering force stored by the driving component 42 can be released to produce reciprocation motion of the total reflection component 20. In some embodiments, the bridging component 40 and the operation component 26 can be integrated with each other monolithically; when the operation component 26 is pressed, the operation component 26 and the bridging component 40 can be simultaneously moved in the first direction D1, and the bridging component 40 can push the total reflection component 20 to produce resilient deformation of the driving component 42.

Besides, the resilient component 28 can be disposed inside the accommodating portion 32 and connected with the operation component 26, and can be used to move the operation component 26 back to an initial position. Therefore, the resilient component 28 can be the compression spring; the resilient component 28 can be resiliently compressed and store the resilient recovering force from the pressure of the operation component 26 by an external force, and resilient component 28 can release the resilient recovering force when the external force applied to the operation component 26 is removed, so as to move the operation component 26 back to the initial position. In some embodiments, the resilient component 28 can be disposed on each corner of the case 18. Position of the resilient component 28 is not limited to the foresaid embodiment and depends on the design demand.

Figure 3:
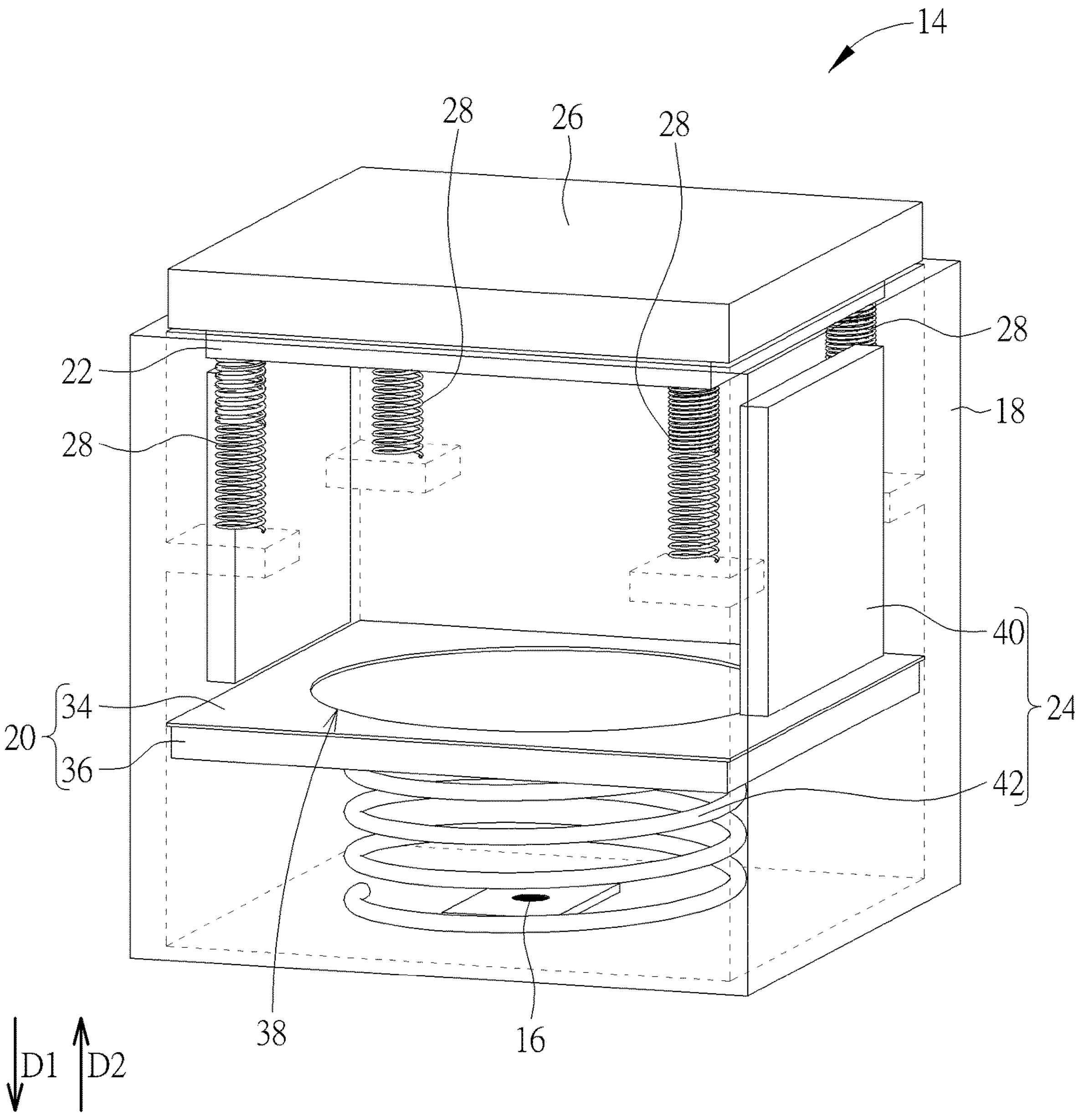
FIG. 3 to FIG. 6 are diagrams of the switch mechanism in different operation modes according to the embodiment of the present application.
Figure 4:
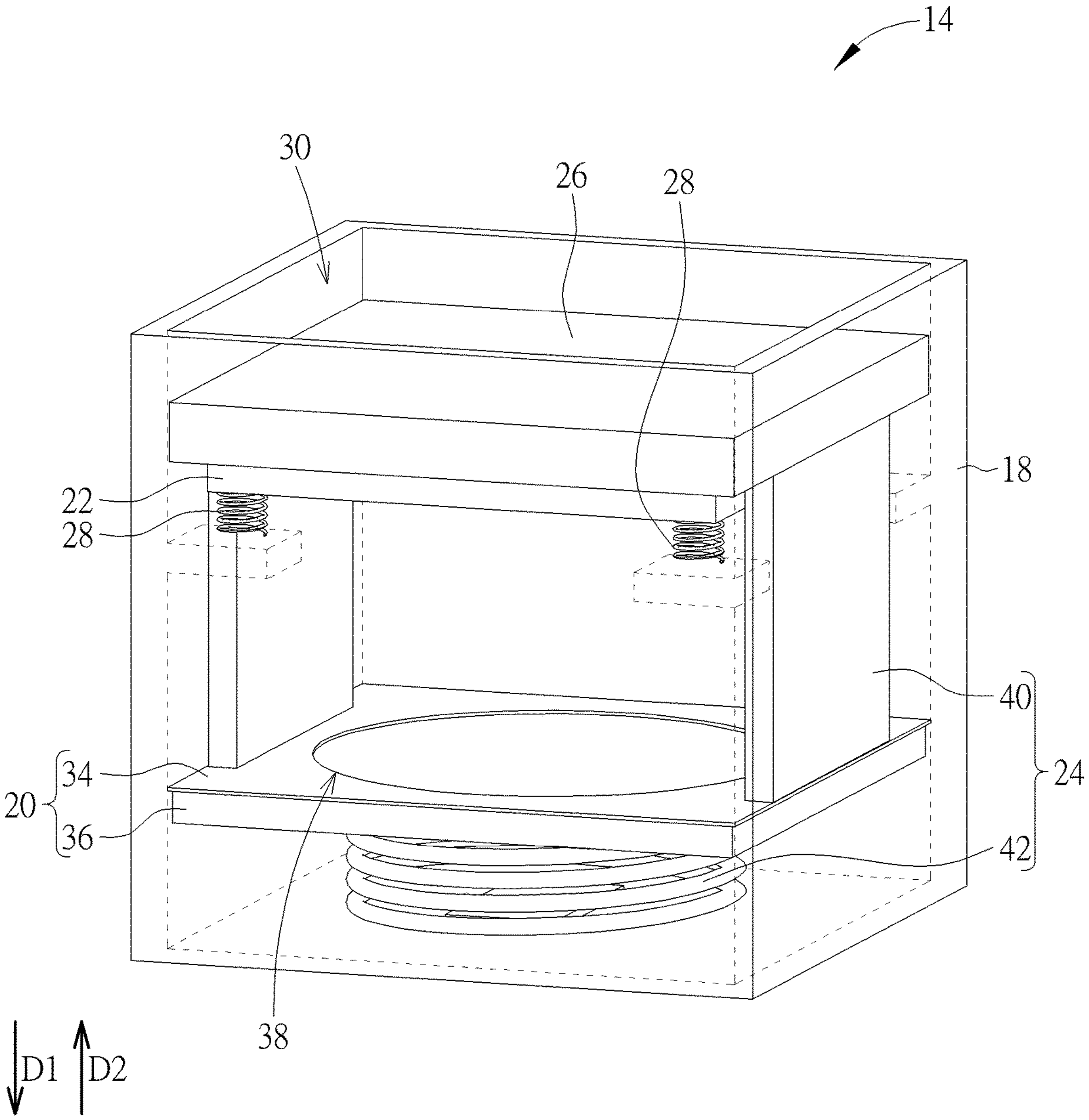

Please refer to FIG. 3 to FIG. 6. FIG. 3 to FIG. 6 are diagrams of the switch mechanism 14 in different operation modes according to the embodiment of the present application. As shown in FIG. 3, the operation component 26 is in an initial position and spaced from the bridging component 40 of the actuation module 24; in the meantime, the driving component 42 (such as the compression spring) and the resilient component 28 (such as the compression spring) are in a state of uncompressed deformation. As shown in FIG. 4, when the operation component 26 is pressed by the external force and moved downwardly to contact the bridging component 40, the electronic switch 16 can be actuate (which means the bridging component 40 is driven by the operation component 26 to actuate the electronic switch 16) to drive the lighting element 36 of the total reflection component 20 to emit the illumination light, and the bridging component 40 can be further pressed to move the total reflection component 20 away from the opening portion 30 in the first direction D1; meanwhile, the driving component 42 (such as the compression spring) and the resilient component 28 (such as the compression spring) are in a state of compressed deformation.

Figure 5:
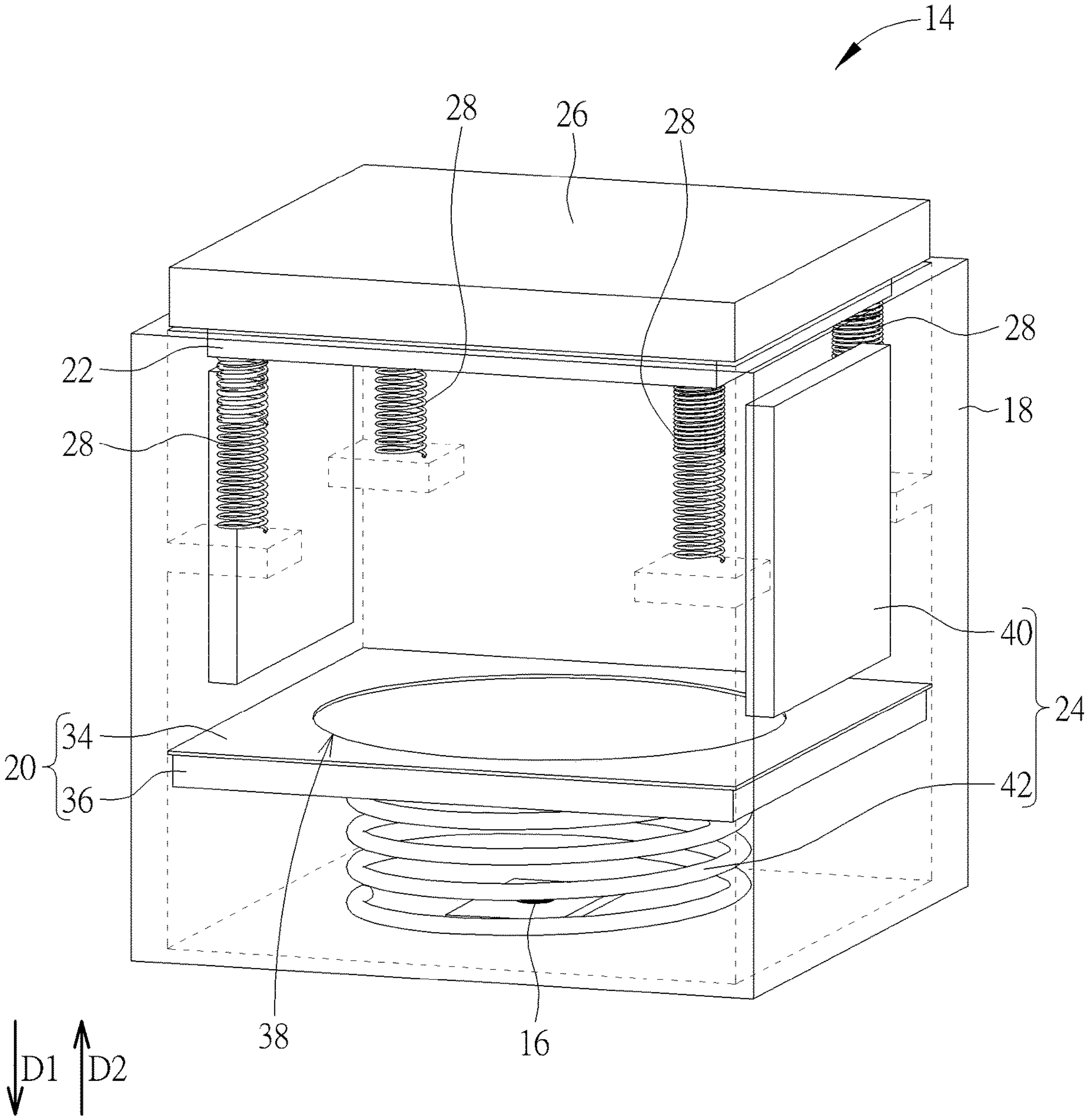
Figure 6:
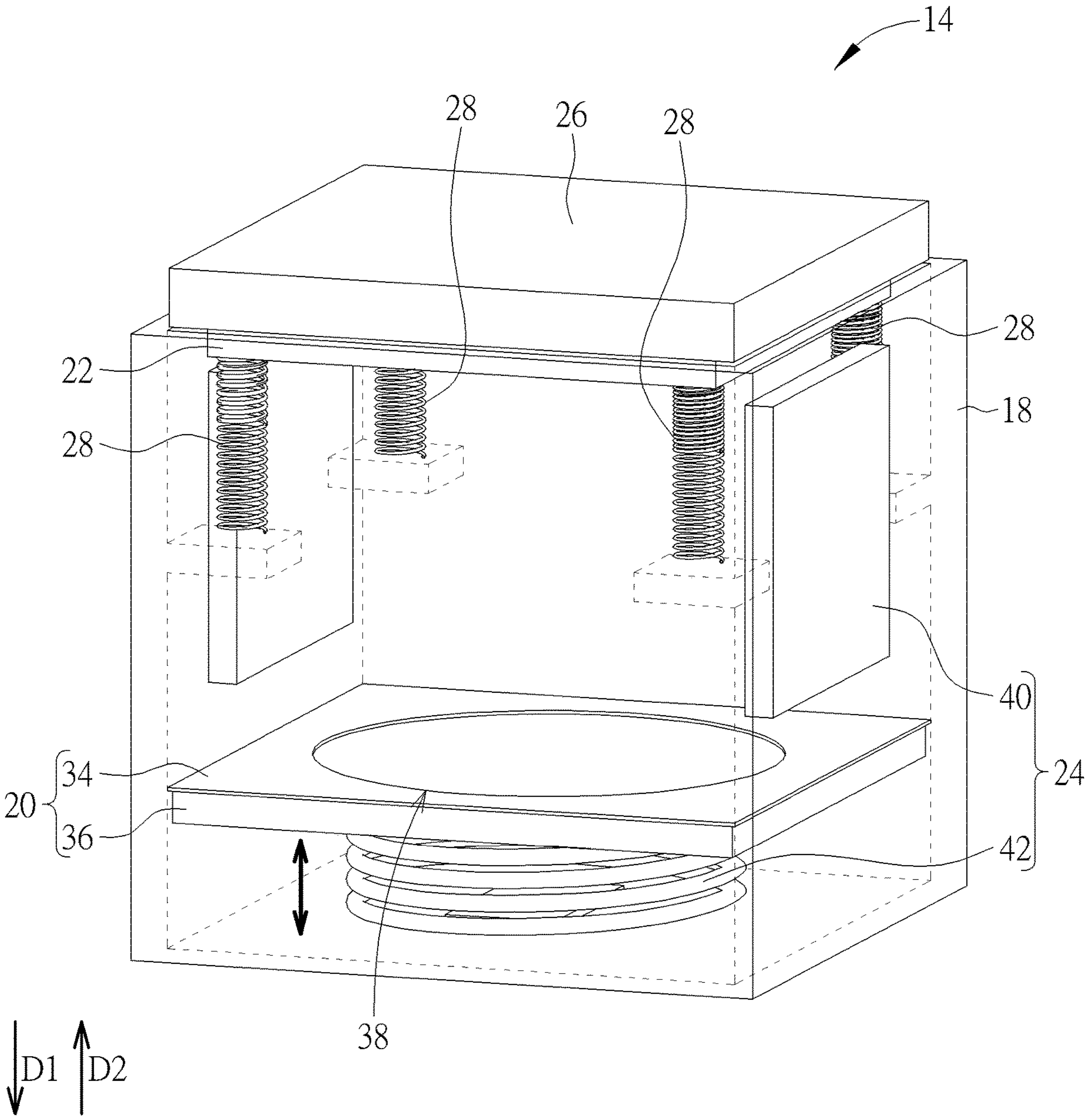

As shown in FIG. 5, when the external force applied to the operation component 26 is removed, the resilient component 28 (such as the compression spring) can release the resilient recovering force, and the operation component 26 can be moved back to the initial position shown in FIG. 3; the driving component 42 (such as the compression spring) can release the resilient recovering force to move the total reflection component 20 towards the opening portion 30 in a second direction D2. The driving component 42 can provide the resilient recovering force, and the total reflection component 20 is in a free state in the first direction D1 and the second direction D2, as shown in FIG. 6; when the driving component 42 release the resilient recovering force, the total reflection component 20 can be driven by the driving component 42 for the reciprocation motion. That is to say, the total reflection component 20 can be moved away from the opening portion 30 in the first direction D1, and then moved towards the opening portion 30 in the second direction D2 to produce the reciprocation motion. The reciprocation motion can be gradually weakened and ended in accordance with release of the resilient recovering force of the driving component 42 (such as the compression spring). Therefore, the actuation module 24 can move the total reflection component 20 relative to the semi-reflection component 22 to produce the reciprocation motion, so the reciprocation motion of the total reflection component 20 can change the static infinite virtual image to the visual effect with dynamic patterns, such as the infinite virtual images with the sense of rhythm on the operation component 26.

Figure 7:
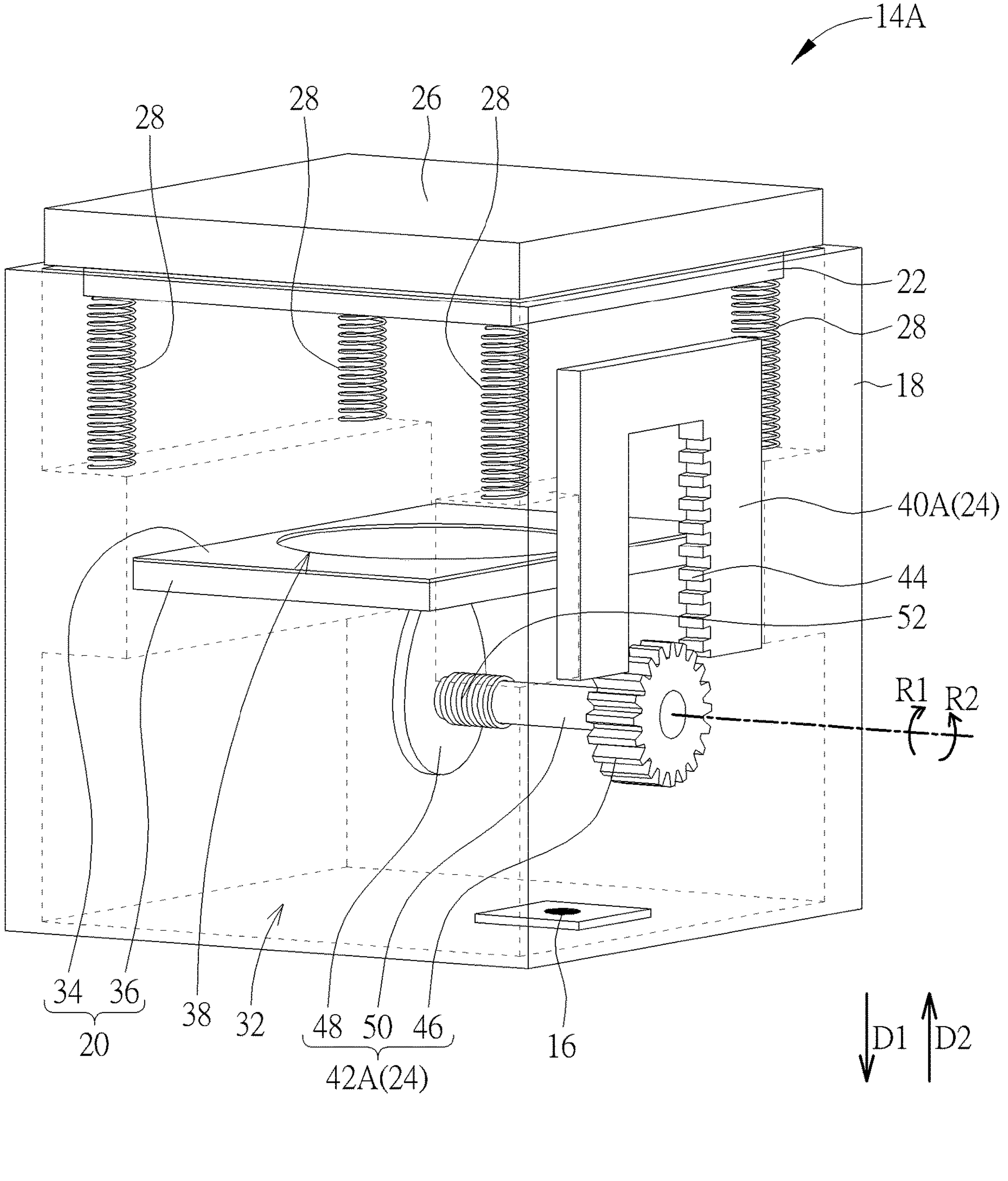
FIG. 7 to FIG. 10 are diagrams of the switch mechanism in different operation modes according to another embodiment of the present application.

Please refer to FIG. 7 to FIG. 10. FIG. 7 to FIG. 10 are diagrams of the switch mechanism 14A in different operation modes according to another embodiment of the present application. In the embodiment, elements having the same numerals as ones of the foresaid embodiment have the same structures and functions, and a detailed description is omitted herein for simplicity. The actuation module 24 of the switch mechanism 14A can include the bridging component 40A and the driving component 42A, and the driving component 42A can be assembly including several elements. As shown in FIG. 7, the bridging component 40A can be the plate body having a rack structure 44, and the driving component 42A can include a gear 46, a cam 48, a connection shaft 50 and a torsion spring 52. The gear 46 and the cam 48 can be respectively disposed on two opposite ends of the connection shaft 50. The cam 48 can abut against the total reflection component 20. The gear 46 can be selectively engaged with the rack structure 44 of the bridging component 40A in a detachable manner. The torsion spring 52 can be disposed on the connection shaft 50. Two opposite ends of the torsion spring 52 can be respectively connected to the case 18 and the cam 48, and the resilient recovering force of the torsion spring 52 can drive the cam 48 to rotate the connection shaft 50 inside the case 18; besides, two opposite ends of the torsion spring 52 can be respectively connected to the case 18 and the gear 46, and the resilient recovering force of the torsion spring 52 can drive the gear 46 to rotate the connection shaft 50 inside the case 18.

Figure 8:
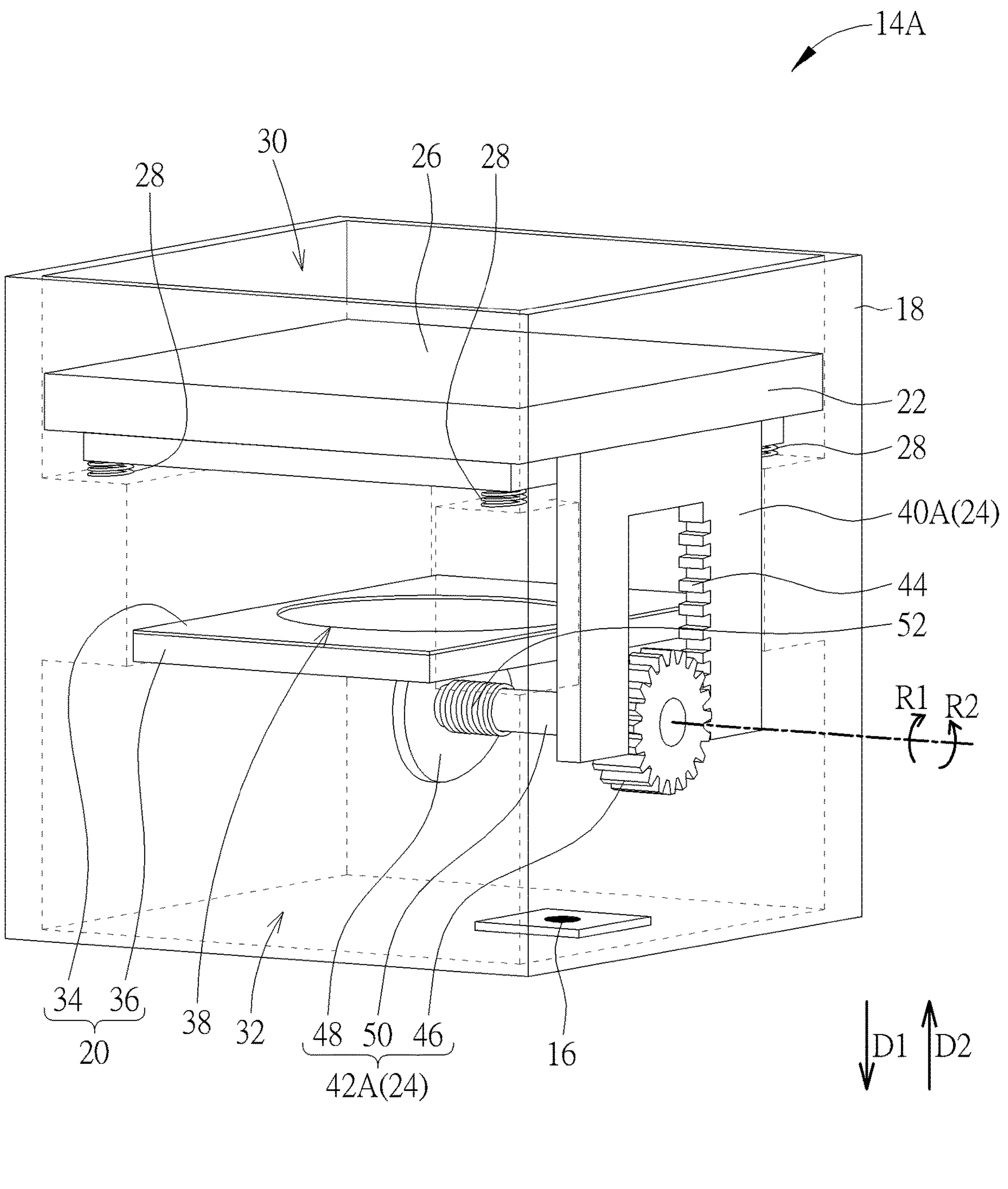

As shown in FIG. 7, the operation component 26 is in the initial position, and spaced from the bridging component 40A of the actuation module 24; in the meantime, the torsion spring 52 of the driving component 42 and the resilient component 28 (such as the compression spring) are in the state of uncompressed deformation. As shown in FIG. 8, when the operation component 26 is pressed by the external force and moved downwardly to contact the bridging component 40A, the electronic switch 16 can be actuated, and the rack structure 44 of the bridging component 40A can rotate the gear 46 in a first rotation direction R1; rotation of the gear 46 can simultaneously rotate the cam 48 in the first rotation direction R1 via the connection shaft 50, and the total reflection component 20 can be moved away from the opening portion 30 in the first direction D1 due to gravity; meanwhile, the torsion spring 52 of the driving component 42 and the resilient component 28 (such as the compression spring) are in the state of compressed deformation.

Figure 9:
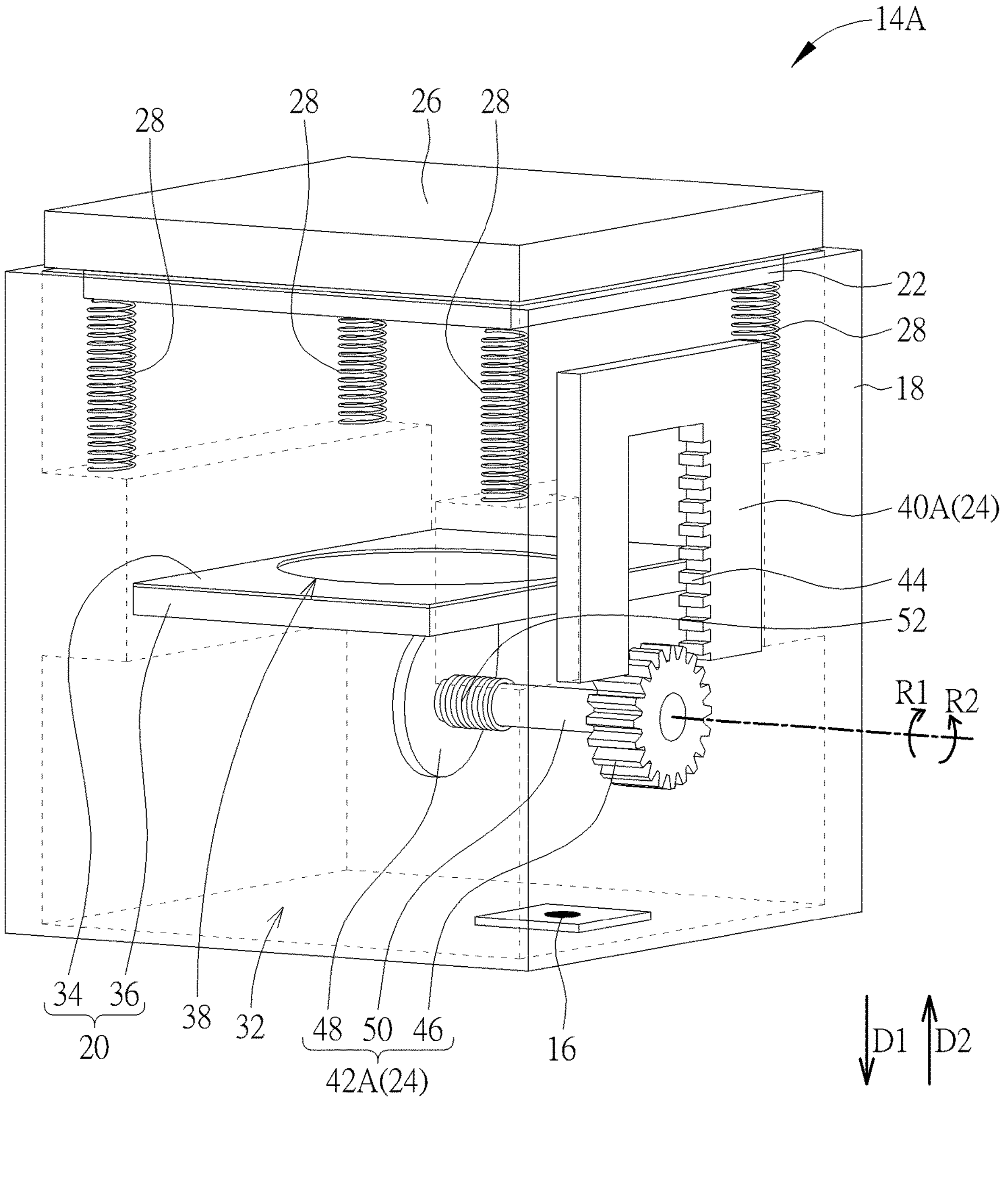
Figure 10:
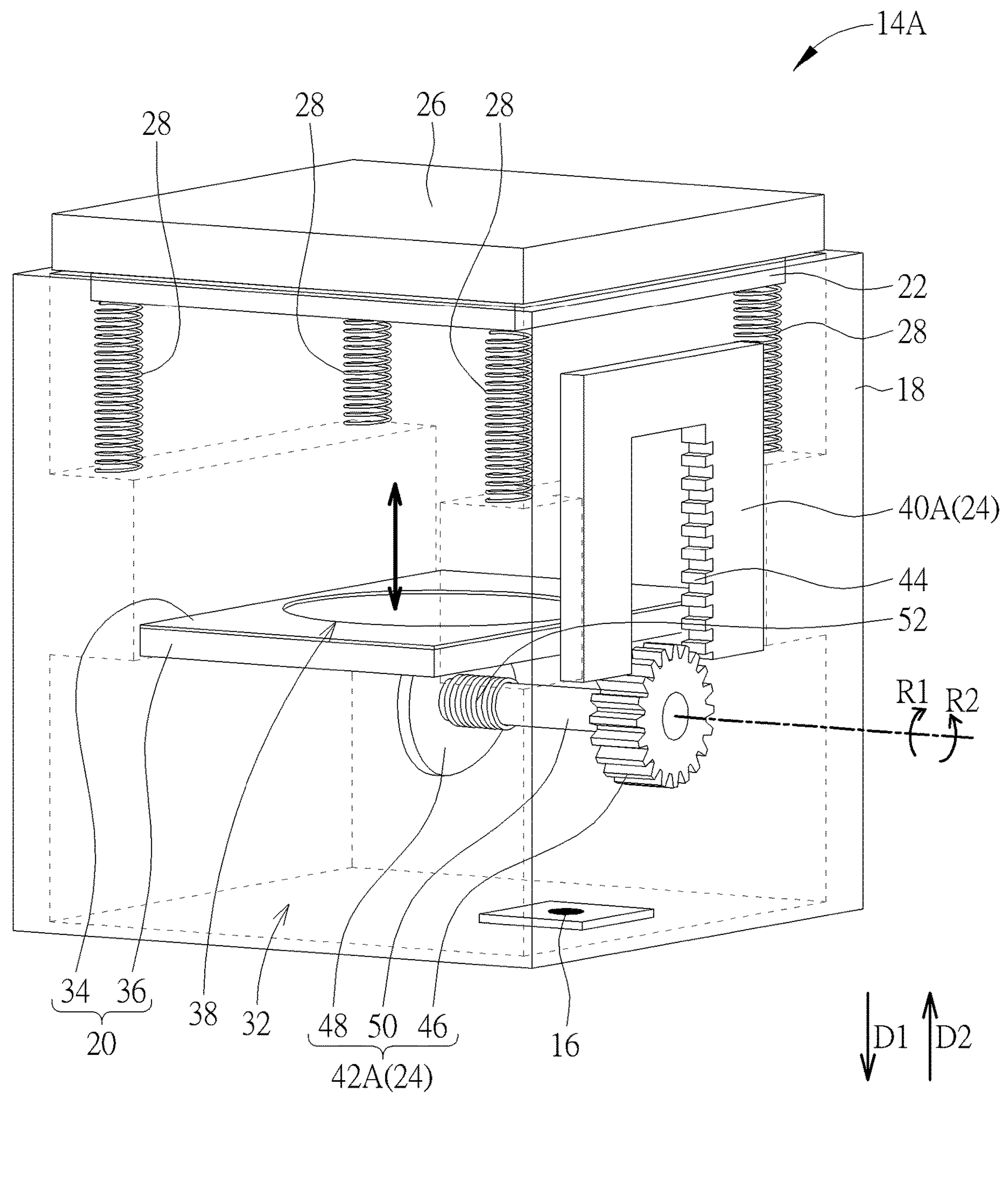

As shown in FIG. 9, when the external force applied to the operation component 26 is removed, the resilient component 28 (such as the compression spring) can release the resilient recovering force to move the operation component 26 back to the initial position shown in FIG. 7; the torsion spring 52 of the driving component 42 can release the resilient recovering force to simultaneously rotate the gear 46, the cam 48 and the connection shaft 50 in the second rotation direction R2. The gear 46 rotated in the second rotation direction R2 can move the bridging component 40A back to the initial position shown in FIG. 7 via the rack structure 44. When the cam 48 is driven by the connection shaft 50 to rotate in the second rotation direction R2, an outer edge of the cam 48 can abut against the total reflection component 20. Because a distance between any point on the outer edge of the cam 48 and a center of the connection shaft 50 is different from another distance between another point on the outer edge of the cam 48 and the center of the connection shaft 50, the cam 48 can move the total reflection component 20 back and forth in the first direction D1 and the second direction D2 to produce the reciprocation motion. The reciprocation motion can be gradually weakened and ended in accordance with release of the resilient recovering force of the torsion spring 52. Therefore, the actuation module 24 can move the total reflection component 20 relative to the semi-reflection component 22, so the reciprocation motion of the total reflection component 20 can change the static infinite virtual image to the visual effect with dynamic patterns, such as the infinite virtual images with the sense of rhythm.

It should be mentioned that edge design of the cam 48 is not limited to the embodiment shown in FIG. 7 to FIG. 10, and depends on the design demand. For example, in other possible embodiment, the cam 48 may be designed with an egg-shaped cross-section; if the cam 48 stayed in the initial state shown in FIG. 7 utilizes the long axis of the egg-shaped cross-section to abut against the total reflection component 20, the total reflection component 20 can produce downward and then upward reciprocation motion; if the cam 48 stayed in the initial state utilizes the short axis of the egg-shaped cross-section to abut against the total reflection component 20, the total reflection component 20 can produce upward and then downward reciprocation motion. Application of the cam 48 is not limited to the foresaid embodiments, and the detailed description is omitted herein for simplicity.

In conclusion, the switch mechanism and the electronic device of the present application can use the actuation module to set connection between the operation component and the total reflection component. When the operation component of the switch mechanism is pressed, the electronic switch can be actuated, and the bridging component of the actuation module can move the total reflection component relative to the semi-reflection component, and the driving component of the actuation module can further change a movement of the total reflection component relative to the semi-reflection component into the reciprocation motion, so that the switch mechanism can provide the infinite virtual images with the sense of rhythm for preferred artistic illumination effect of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switch mechanism comprising:

a case;

a total reflection component movably disposed inside the case;

a semi-reflection component disposed inside the case and spaced from the total reflection component and on a position of the total reflection component that is opposite to the bottom;

an actuation module connected to the total reflection component; and an operation component, the operation component and the total reflection component being respectively located on two opposite surfaces of the semi-reflection component;

wherein the actuation module is driven by the operation component so that the total reflection component is moved relatively to the semi-reflection component.

2. The switch mechanism of claim 1, wherein the total reflection component comprises a total reflective mirror and a lighting element, the lighting element is disposed on a surface of the total reflective mirror away from the semi-reflection component.

3. The switch mechanism of claim 1, wherein the switch mechanism further comprises a resilient component disposed between the operation component and the case.

4. The switch mechanism of claim 1, wherein the total reflection component comprises a total reflective mirror and a lighting element, the lighting element is disposed on a lateral side of the total reflective mirror.

5. The switch mechanism of claim 4, wherein the total reflective mirror comprises a groove, illumination light of the lighting element passes through the groove to form a pattern, the groove is formed on a surface of the total reflective mirror facing the semi-reflection component, or formed on a surface of the total reflective mirror away from the semi-reflection component, or formed inside the total reflective mirror.

6. The switch mechanism of claim 1, wherein the actuation module comprises a bridging component and a driving component, the driving component is connected to the total reflection component, the bridging component is movably disposed on a lateral surface of the case, wherein the driving component is moved by the operation component through the bridging component, and the total reflection component is driven by the driving component.

7. The switch mechanism of claim 6, wherein the bridging component is spaced from the operation component, or is integrated with the operation component monolithically.

8. The switch mechanism of claim 6, wherein the bridging component is a plate body, the driving component is a compression spring disposed on a surface of the total reflection component away from the semi-reflection component, and the compression spring is pushed by the plate body via the total reflection component to store a resilient recovering force.

9. The switch mechanism of claim 6, wherein the bridging component comprises a rack structure, the driving component comprises a gear, a cam and a connection shaft, the gear and the cam are respectively disposed on two opposite ends of the connection shaft, the cam abuts against the total reflection component, and the gear is engaged with the rack structure.

10. The switch mechanism of claim 9, wherein the driving component further comprises a torsion spring disposed on the connection shaft, and the cam is driven by a motion of the total reflection component via a resilient recovering force of the torsion spring.

11. An electronic device comprising:
- a housing; and
- a switch mechanism disposed inside the housing, the switch mechanism comprising:
  - a case;
  - a total reflection component movably disposed inside the case;
  - a semi-reflection component disposed inside the case and spaced from the total reflection component and on a position of the total reflection component that is opposite to the bottom;
  - an actuation module connected to the total reflection component; and
  - an operation component disposed between the housing and the case of the switch mechanism, the operation component and the total reflection component being respectively located on two opposite surfaces of the semi-reflection component;
  - wherein the actuation module is driven by the operation component so that the total reflection component is moved relatively to the semi-reflection component.

12. The electronic device of claim 11, wherein the total reflection component comprises a total reflective mirror and a lighting element, the lighting element is disposed on a surface of the total reflective mirror away from the semi-reflection component.

13. The electronic device of claim 11, wherein the switch mechanism further comprises a resilient component disposed between the operation component and the case.

14. The electronic device of claim 11, wherein the total reflection component comprises a total reflective mirror and a lighting element, the lighting element is disposed on a lateral side of the total reflective mirror.

15. The electronic device of claim 14, wherein the total reflective mirror comprises a groove, illumination light of the lighting element passes through the groove to form a pattern, the groove is formed on a surface of the total reflective mirror facing the semi-reflection component, or formed on a surface of the total reflective mirror away from the semi-reflection component, or formed inside the total reflective mirror.

16. The electronic device of claim 11, wherein the actuation module comprises a bridging component and a driving component, the driving component is connected to the total reflection component, the bridging component is movably disposed on a lateral surface of the case, wherein the driving component is moved by the operation component through the bridging component, and the total reflection component is driven by the driving component.

17. The electronic device of claim 16, wherein the bridging component is a plate body, the driving component is a compression spring disposed on a surface of the total reflection component away from the semi-reflection component, and the compression spring is pushed by the plate body via the total reflection component to store a resilient recovering force.

18. The electronic device of claim 16, wherein the case has an electronic switch, and the bridging component is driven by the operation component to actuate the electronic switch, so that a lighting element of the total reflection component emits illumination light accordingly.

19. The electronic device of claim 16, wherein the bridging component comprises a rack structure, the driving component comprises a gear, a cam and a connection shaft, the gear and the cam are respectively disposed on two opposite ends of the connection shaft, the cam abuts against the total reflection component, and the gear is engaged with the rack structure.

20. The electronic device of claim 19, wherein the driving component further comprises a torsion spring disposed on the connection shaft, and the cam is driven by a motion of the total reflection component via a resilient recovering force of the torsion spring.

* * * * *